United States Patent [19]

Eaton

[11] Patent Number: 4,685,636
[45] Date of Patent: * Aug. 11, 1987

[54] REEL AND REEL HANDLING SYSTEM

[75] Inventor: Homer L. Eaton, Leucadia, Calif.

[73] Assignee: MTS Vektronics Corporation, Carlsbad, Calif.

[*] Notice: The portion of the term of this patent subsequent to Jan. 27, 2004 has been disclaimed.

[21] Appl. No.: 748,339

[22] Filed: Jun. 24, 1985

[51] Int. Cl.⁴ .............................................. B65H 49/00
[52] U.S. Cl. .................................. 242/129; 206/409; 242/130; 242/170
[58] Field of Search ............................... 206/389, 409; 242/130.2, 129, 170 X, 171, 159, 130 X, 747 X

[56] References Cited

U.S. PATENT DOCUMENTS

| 2,029,975 | 2/1936 | Winchester | 242/129 |
| 2,533,495 | 12/1950 | Moffett | 242/129 |
| 2,533,731 | 12/1950 | Gomberg | 242/129 |
| 2,824,709 | 2/1958 | Macy | 242/129 X |
| 3,138,309 | 6/1964 | Hulterstrum | 242/129 X |
| 3,212,729 | 10/1965 | Putnam | 242/129 |
| 3,602,455 | 8/1971 | Lewis | 242/129 |
| 3,648,949 | 3/1972 | Berger et al. | 206/389 X |
| 3,819,847 | 6/1974 | Charles | 242/129 X |
| 3,902,679 | 9/1975 | Bost | 242/129 |

Primary Examiner—Howard N. Goldberg
Assistant Examiner—Joseph M. Gorski
Attorney, Agent, or Firm—Gausewitz, Carr & Rothenberg

[57] ABSTRACT

A wire harness is partly assembled by winding a number of wires on individual reels, fixing terminal pins to the wire ends, stacking the reels in the carousel support, upon which a multiple pin connector is mounted, and withdrawing individual wires for conection to the connector. A spindle extending through all wire reels is detachably connected to a support bar to enable the entire stack of reels with the wire thereon to be handled as a unitary assembly. The reels are stacked flat upon each other because the reel hubs are thicker to accommodate enlargement of reel peripheries as wire projects from the reels.

2 Claims, 12 Drawing Figures

REEL AND REEL HANDLING SYSTEM

BACKGROUND OF THE INVENTION

The present invention relates to methods and apparatus for handling electrically or optically conductive insulated wire, and more particularly, concerns improved handling of such wire for various operations such as wire harness assembly.

In the assembly of wire harnesses, groups of electrically or optically conductive wires or filaments having terminals or terminal pins secured to their ends are inserted into apertures in connectors. For assembly of the wire harness, lengths of wire are cut, ends stripped, and terminal pins are secured to the ends. Thereafter, individual lengths of wire are transported to an assembly area where the harness is assembled by inserting the terminal pins into multi-pin connectors and laying the wires in bundles extending from one connector to another.

Among the many types of arrangements for handling wires are a variety of wire reels and spools or spool holding devices. Such arrangements do not readily lend themselves to rapid and efficient harness assembly or other wire processing or handling operations, and do not readily lend themselves for automatic harness assembly.

In a system described in my prior patent application for Wire Processing Method and Apparatus, Ser. No. 615,933, Filed May 31, 1984, the disclosure of which is incorporated by this reference as though fully set forth herein, there are described methods and apparatus for preparing wire for harness assembly. In the apparatus and method described in this prior application, each wire that is formed for assembly into a harness is individually wound on a separate reel and cut to a predetermined length, with both ends of the wire projecting from between the resilient peripheral lips of the reel. The projecting wire ends are grasped and clamped in conveyor mounted clamps which move the reel together with the wire wound thereon to various end-finishing stations at which the wire ends are stripped and terminal pins attached. Terminated wires wound on the reel then may be fed to a machine for automatic terminal insertion, such as for example, the apparatus illustrated in my co-pending application for Method and Apparatus for Terminal Insertion, Ser. No. 646,949, Filed Sept. 4, 1984, where the wire ends are automatically inserted into desired multi-pin connectors. For certain applications, however, it may not be desired to employ apparatus capable of inserting both ends of a wire into a connector, or it may be desired to manually insert an end of the wire into a connector. Further, it may be desirable to handle groups of wires and their reels either individually or collectively as a unit. The reels, with wire wound thereon, must also be stored, stacked and handled for various types of processing or assembly operations.

Where wire is wound upon a reel and has an end protruding between resilient lips of the reel, the sides of the reel are necessarily expanded to some extent by the diameter of the protruding wire. This prevents a number of reels from being stacked upon each other without a progressively increasing tilt of the stack. Stack tilt may interfere with the operation to be carried out on the wire of reels in a tilted stack.

Accordingly, it is an object of the present invention to provide methods and apparatus that facilitate handling, transport and storage of wire for various types of processing and assembly operations.

The term wire is used herein to denote both electrical wires, comprising metallic or similar electrical conductors covered with insulation, and also, optical fibers, used for transmission of optical signals. Such optical fibers are provided with terminal pins that enable their insertion into connector elements that maybe quite similar to the multi-pin connector elements employed for electrical wires.

SUMMARY OF THE INVENTION

In carrying out principles of the present invention, in accordance with a preferred embodiment thereof, reels of a group of wire receiving reels are stacked upon one another in a support to which one or more multi-pin connectors may be mounted, whereby wire from each of the reels may be withdrawn individually and the terminal pins thereof inserted into the adjacent connector on the support. To ensure that the stacked reels lie flat upon one another, without tilt of the stack, each reel hub is axially enlarged so that the hub enlargement rests upon the hub enlargement of an underlying reel. According to another feature of the invention, a spindle extends through an entire stack of reels, with the reels of the stack detachably fixed to the spindle so the entire assembly of reels and spindle may be transported or positioned as a unit for further processing or handling of individual wires.

DETAILED DESCRIPTION

Figure 1:
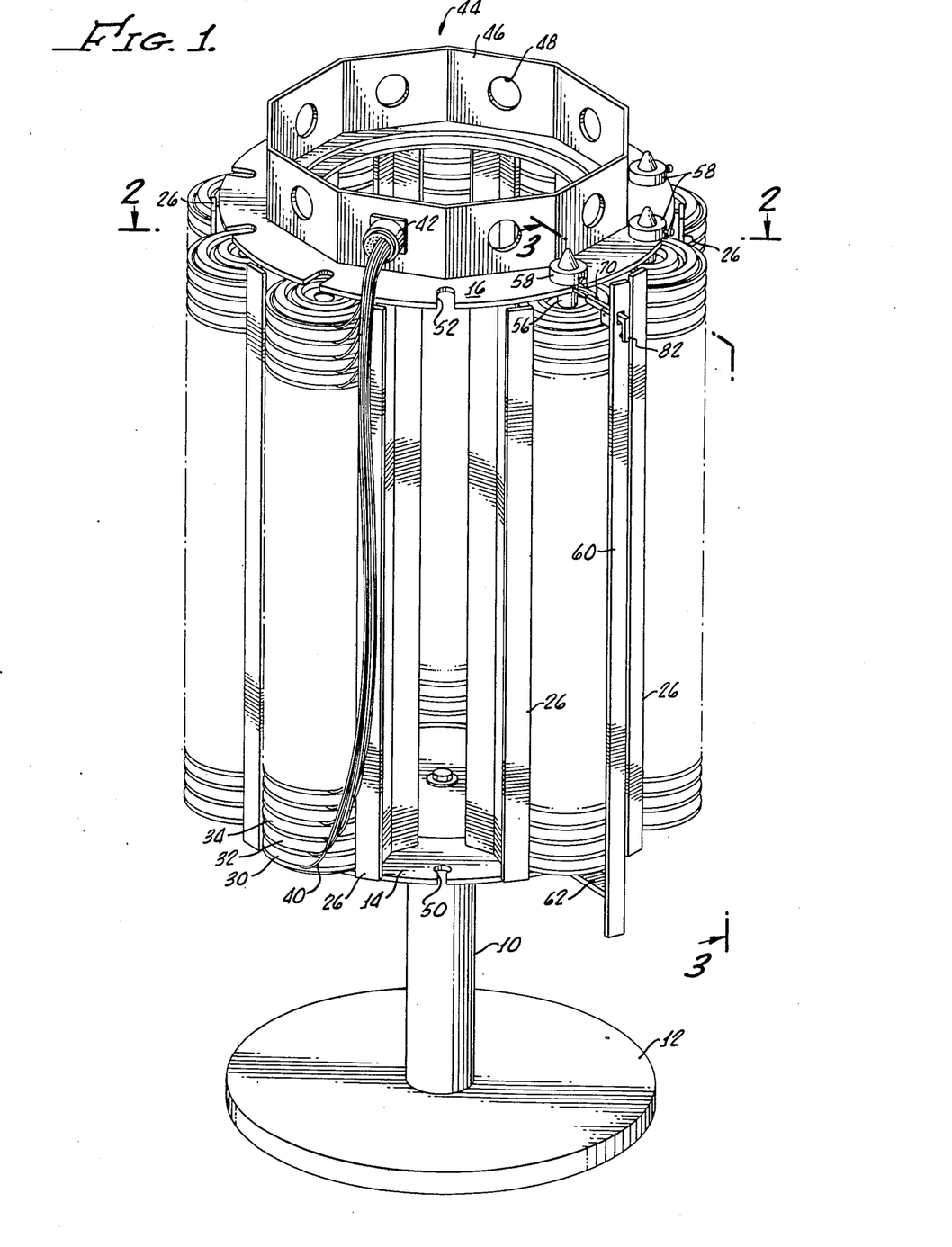
FIG. 1 is a perspective illustration of a carousel support having stacks of reels thereon.
Figure 2:
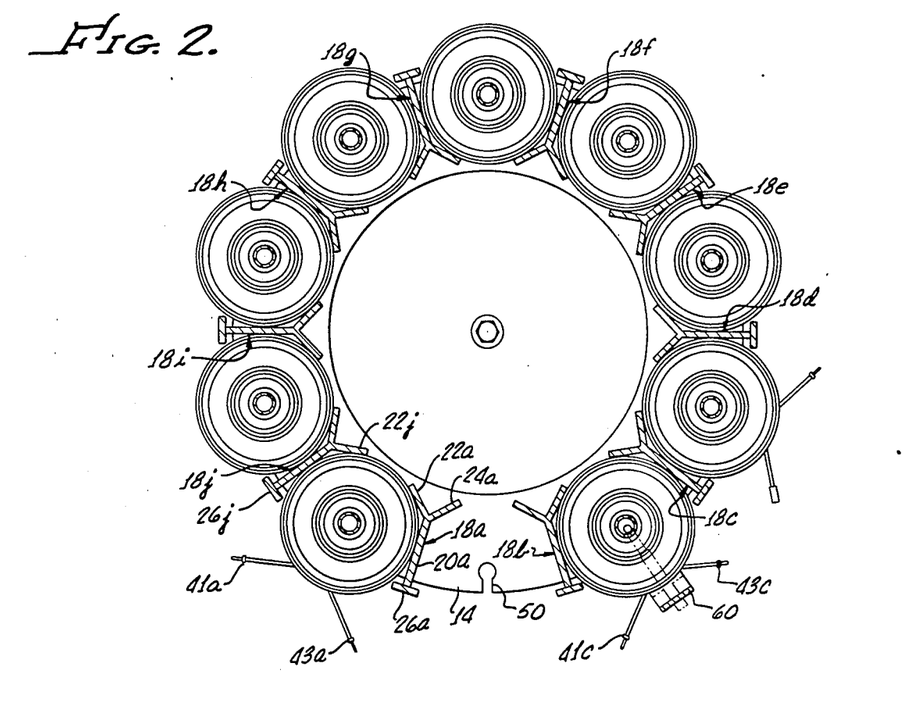
FIG. 2 is a plan view of the support of FIG. 1.

Illustrated in FIG. 1 is an arrangement adapted to facilitate either manual or automatic insertion of terminals in a multi-pin connector. A carousel support comprises a column 10 mounted on a base 12 that fixedly carries an annular bottom support plate 14. Bottom support plate 14 is connected to a fixed upper annular plate 16 by means of a plurality of circumferentially spaced upstanding radially extending vertical partitions 18a, 18b, 18c, 18d, 18e, 18f, 18g, 18h, 18i, 18j. Each partition, as viewed in FIG. 2, includes a side plate 20, a pair of rear, mutually-angulated back plates, 22, 24 extending in different directions rearwardly from a rear edge of the side plate 20, and an entry plate 26 fixed to and extending transversely of the front edge of the side plate, adjacent pairs of partitions such as 18a and 18j form a vertically extending recess having sides defined by the side plates of partitions 18a, 18j and having the rear sides of the recesses defined by spaced pairs of mutually opposing rear plates 22a, 22j.

Each recess is adapted to receive a plurality of reels, such as reels 30, 32 34, stacked one upon the other for all or part of the full height of the recess. Each reel has a length of wire, such as wire 40, wound thereon with ends 41, 43 of the wire protruding from the reel. One of these ends is adapted to be connected to and within an aperture of a multi-pin connector 42 that is detachably mounted upon a connector crown 44 fixed to upper support plate 16 and extending upwardly therefrom. Crown 44 is formed of a number of mutually interconnected fixed upstanding flat plates, such as plate 46, each having an aperture 48 into which a portion of a connector may be inserted for detachably fixing the connector to the crown in a suitable manner.

Figure 3:
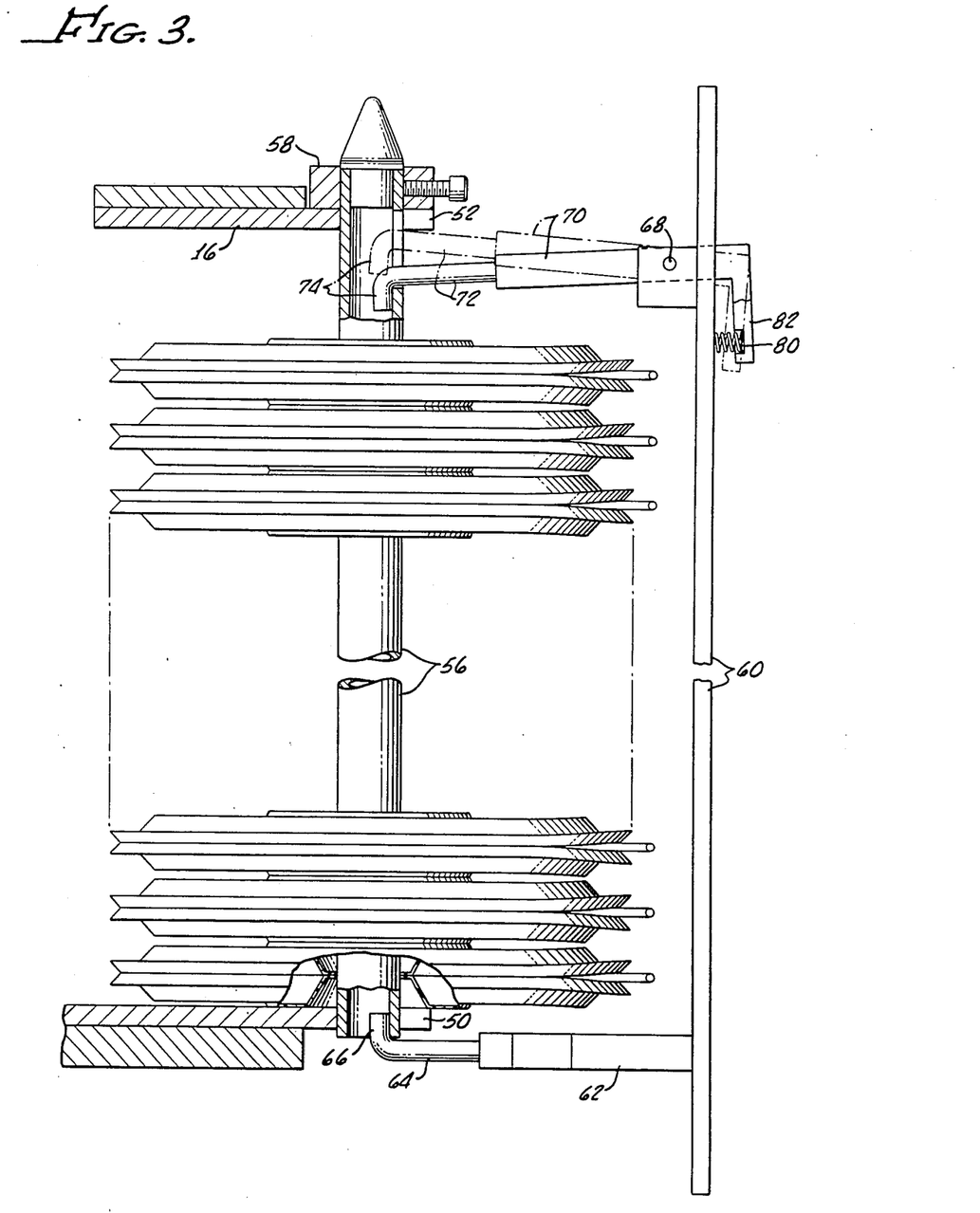
FIG. 3 is a side elevational view of a single stack of reels with reel spindle and support bar attached.

Lower plate 14 and upper plate 16 each have a plurality of circumferencially spaced outwardly opening recesses, such as lower plate recesses 50 and upper plate recesses 52, adapted to receive upper and lower ends of a spindle 56. As best shown in FIG. 3, the spindle extends through central apertures in the hub of each of the reels and has an enlargement, such as a collar 58, fixed to an upper end thereof whereby the spindle, by means of the collar 58, may rest upon and be supported by the upper plate 16.

The reels are confined to and upon the spindle, by means of a support bar 60, extending parallel to the reel stack, having a lower arm 62 terminating in an L-shaped pin 64 of which an upwardly extending end 66 can be inserted into the open lower end of the spindle 56. Pivoted to the upper end of bar 60 on the axis of a pin 68 is an upper support bar arm 70 having an L-shaped pin 72 on its free end. Pin 72 includes a downwardly projecting end portion 74 that is adapted to be received in an elongated slot 76 formed in the side of spindle 56. Pin 72 engages an edge 78 of the slot 76 to detachably retain the arm 70 connected with the spindle 56. A compression spring 80 is interposed between support bar 60 and a transversely extending operating lever 82 fixed to the arm 70. The compressed spring tends to pivot the arm in a counterclockwise direction to hold the pin end 74 in engagement with the spindle edge 78. Arm 70 may be pivoted in a clockwise direction to the illustrated dotted line position (FIG. 3) to allow insertion and removal of the pin 72 into and from the spindle slot, whereby the entire support arm 60 together with its upper and lower arms 62, 70 may be detached from or connected to a spindle having a stack of reels thereon.

Figures 4, 5:
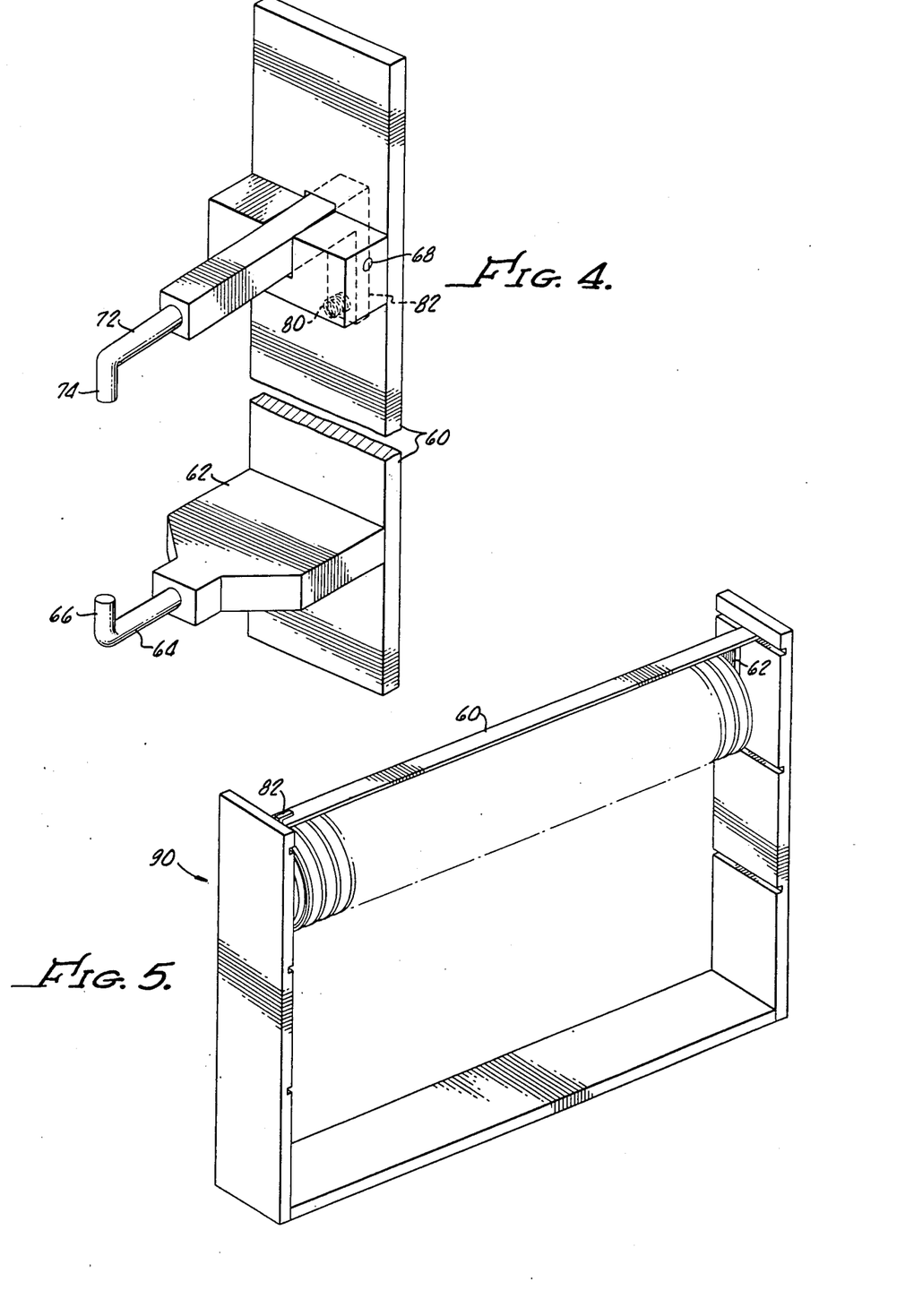
FIG. 4 is a perspective with parts broken away of the support bar shown in FIG. 3.
FIG. 5 illustrates an arrangement of separately mounting an assembly of reels, spindle and support bar.

The reels, spindle and support arm 60 may be withdrawn from a carousel recess as a unitary assembly by raising the entire assembly to pass the pin 64 through the open slot 50 whereby the assembly may be removed from the carousel support. The reels are inserted into the recess through the laterally, outwardly opening side of the recess and may be stacked one upon the other within the recess and retained therein with or without the use of the spindle 56 and or the support arm 60. The distance between mutually facing edges of entry plates, such as plates 26a and 26j, is made less than the diameter of a reel by a very small amount, whereby each reel may be inserted into the slot laterally while the reel is positioned in horizontal position, lying in a plane perpendicular to the longitudinal extent of the recess and the carousel support. The flexible reel must be very slightly distorted to permit entry of the reel (when oriented horizontally) into the recess and withdrawl of the reel from the recess. Of course, individual reels, if deemed necessary or desirable, may be readily inserted into the recess by tilting the plane of the reel, without any reel deflection. However, it is contemplated that automatic equipment for inserting each reel into a recess in the carousel support will position the reel in a horizontal plane as it is being inserted. Further, the entire stack of reels as an assembly with the spindle and support arm, is most readily withdrawn from the recess with all reels being substantially horizontal. The assembly of reels, spindle and support bar is thus readily removed from the carousel support, transported and/or mounted on some additional support for further processing or handling of the wires on the individual reels. For example, as illustrated in FIG. 5, an assembly of stacked reels, spindle and support may be mounted on a U-shaped support 90 whereby wires on the individual reels may be withdrawn for further processing operations.

Figure 6:
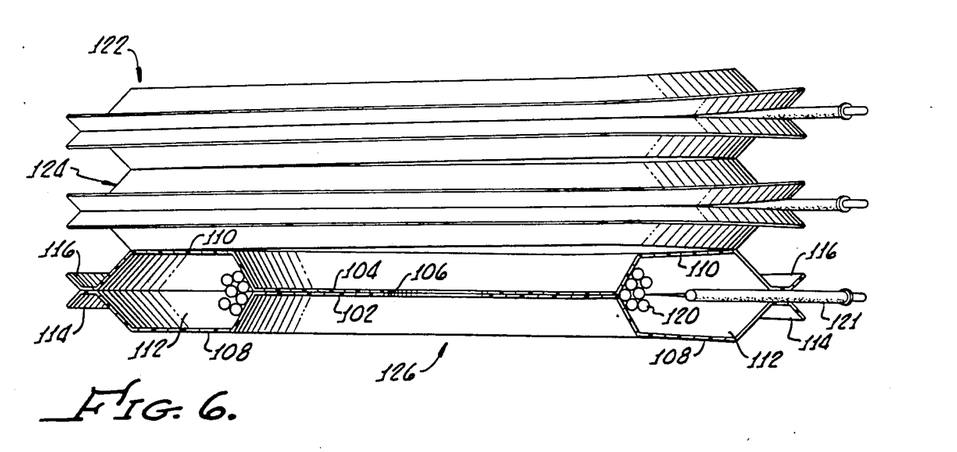
FIG. 6 illustrates a stack of reels that have not been specially modified for stacking.

Reels of the stack of reels illustrated in FIG. 6 are each made of relatively thin, flexible and resilient sheets of plastic having central hub sections 102, 104 fixedly secured to one another about a common central aperture 106 and each having outwardly bent annular chamber sections 108, 110, respectively, collectively forming a wire receiving chamber 112. Each chamber section 108, 110 has a peripheral entry lip 114, 116, respectively, that are mutualy diverging to allow lateral entry of a wire into the chamber. A length of wire 120 wound about the reel hub within the chamber 112 has one or both of its ends 121 protruding from between the chamber lips 114, 116, as shown in FIG. 6 whereby the outer surfaces of chamber sections 108, 110 are outwardly displaced relative to one another.

When reels of the type illustrated in FIG. 6 are stacked one upon the other, the annular outer surface of the bent chamber section of one reel rests upon the annular outer surface of the bent chamber section of the adjacent reel. With a wire protruding from between the chamber lips 114, 116, the two chamber sections of a single reel are mutually displaced outwardly so that a reel 124 supported on the lower reel 126 is tilted at an angle to the horizontal. In stacking reels within a recess of the carousel support, it is preferable to have wire ends protruding from substantially the same vertically aligned points on the peripheries of all of the stacked reels. Accordingly, each reel of a stack is axially enlarged at the same peripherial point, and the several axial enlargements of the several stacked reels all combine to provide a reel inclination to the horizontal that increases as the total number of stacked reels increases. Three reels of such a stack are illustrated in FIG. 6 clearly showing the upper most reel 122 to be significantly tilted from the horizontal plane of symmetry of the lower most reel 126 of this three-reel stack. With a stack of ten to twenty reels, the tilt of the upper most reels will be much greater.

As previously mentioned, it is important to be able to insert each reel horizontally into the recess of the carousel support and, more importantly, it may be necessary to automatically insert one reel into a stack of reels between a pair of reels at an intermediate point along the length of the stack. This is so because in an automatic machine for producing loaded reels and stacking them one upon the other, it is necessary to keep track of the position of each of the reels because each reel may have a different length of wire wound thereon. Thus, in a machine for automatic production of the reels, a selected length of wire is wound upon each reel with both ends protruding from the reel and the wire ends are stripped and terminated. The reel is inspected and then placed on the top of a stack of previously prepared reels located in the carousel support. The reels in the stack thus have a preselected order from bottom to top. The machine for insertion of a reel into the stack holds the reel in a horizontal position during insertion. If upon inspection at one of the steps of manufacture of the reel, it is found that the reel or the wire thereon is defective in some respect, such reel is discarded before insertion into the stack. However, reel production continues with the manufacture of reels succeeding the defective reel. The succeeding reels are then placed one upon the other upon the stack of reels, resulting in a stack from which the defective reel has been omitted. The defective reel is remade and is inserted into a stack of reels in its proper position along the length of the stack. If the reels of the stack are all tilted at some unknown angle, in the manner illustrated in FIG. 6, automatic insertion of a reel at an intermediate point of the height of the stack, by a machine that holds the reel in a horizontal position is difficult, if not impossible to achieve because the reels between which the horizontal reel is to be inserted are tilted from the horizontal. Accordingly, it is necessary to ensure that the stacked reels all remain horizontal.

Figure 7:
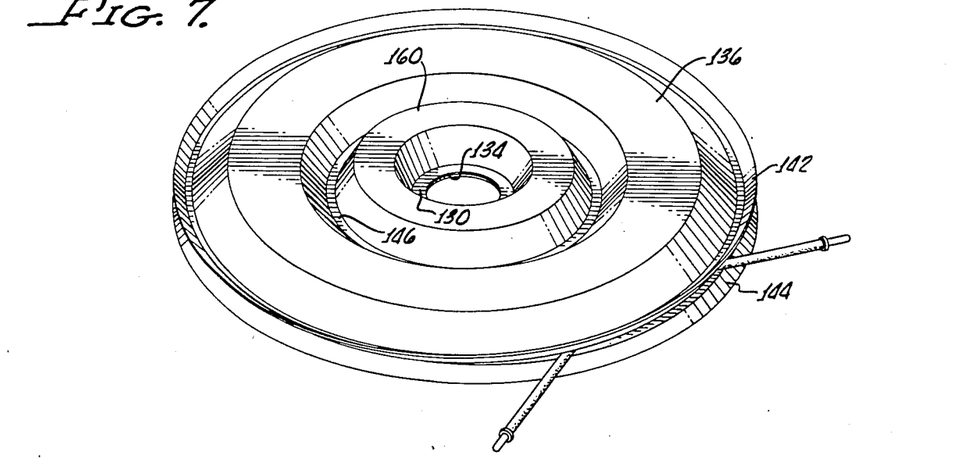
FIG. 7 is a perspective view of a reel modified for horizontal stacking.
Figure 8:
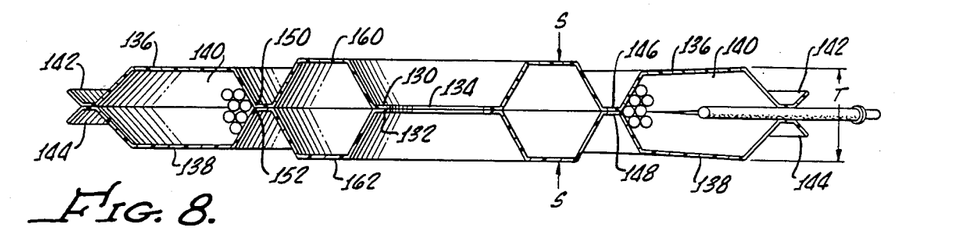
FIG. 8 is a sectional view of the reel of FIG. 7.

To ensure that all reels in a stack remain horizontal, reels of the type illustrated in FIG. 6 are modified to provide an axially enlarged stacking section adjacent to the reel hub and inwardly of the reel wire receiving chamber so that each reel will rest upon the axially enlarged stacking section of the adjacent reel, rather than on the variably expandable wire receiving chamber section of the adjacent reel. Thus, as best seen in FIGS. 7 and 8, each modified reel is made of first and second integral, resilient side plates fixedly connected to one another at hub sections 130, 132 and having a common spindle receiving aperture 134. Each reel side plate also has an outwardly bent annular cavity section 136, 138 forming an annular wire receiving chamber 140, with each section terminating in an outwardly diverging lip 142, 144, respectively. The side plates are also secured together at annular intermediate sections 146, 148 immediately inwardly of the inner side of the wire receiving chamber 140 whereby the resilient cavity sections 136, 138 may be displaced outwardly by a wire protruding between the lips 142, 144 and in such displacement will bend about the innermost ends of the cavity sections at points 150, 152, at which points the cavity sections join intermediate sections 146, 148. The annular intermediate sections 146, 148 form outwardly facing circular grooves concentric with the hub and on both sides of the reel.

Between the hub sections 130, 132 and the intermediate sections 146, 148, each reel side plate is formed with an outwardly bent annular stacking section 160, 162, respectively, each of which has an outer surface displaced axially from the outer surface of the other by a distance S that is not less than the maximum axial distance T between outer surfaces of the cavity sections when a wire of maximum expected diameter is positioned between the cavity section lips. Therefore, even with a wire passing between the lips of the cavity sections, so that the cavity sections of the two side plates are axially displaced, each reel will rest directly upon the immediately adjacent lower reel with stacking sections thereof in abutment with one another. The axial enlargement of the cavity sections due to the protruding wire will not tend to tilt any reel. Accordingly, all reels of a stack of reels will be, and remain precisely parallel to one another, each having its plane of symmetry (perpendicular to the axis of the reel hub) extending in a substantially horizontal plane. Although the annular stacking sections are most readily formed as continuous annular surfaces, other forms of surfaces are comtemplated such as a series of axial protrusions, for example, that will ensure mutually parallel orientation of a group of reels stacked one against the other, and all having outer lips spread apart by projection wire.

Preferably, each side reel side plate is made of a thin, stiff resilient material, although resilience is required only of inner portions of the cavity sections so as to allow the cavity sections to open and the lips of the cavity sections to firmly and resiliently grasp a wire passing therebetween.

Figure 9:
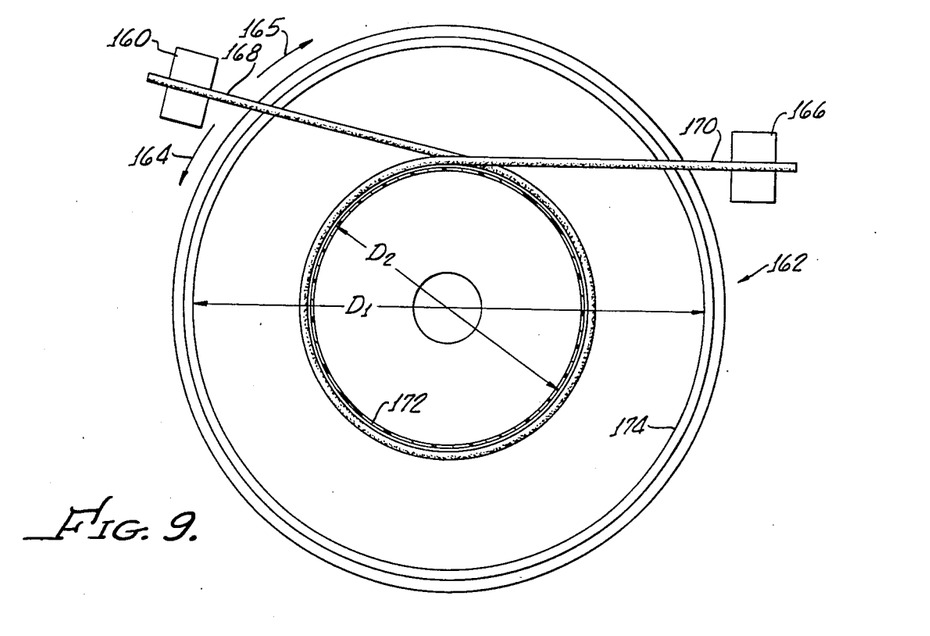
FIGS. 9 and 10 are schematic illustrations of partial unwinding of a turn of wire within a reel chamber.
Figure 10:
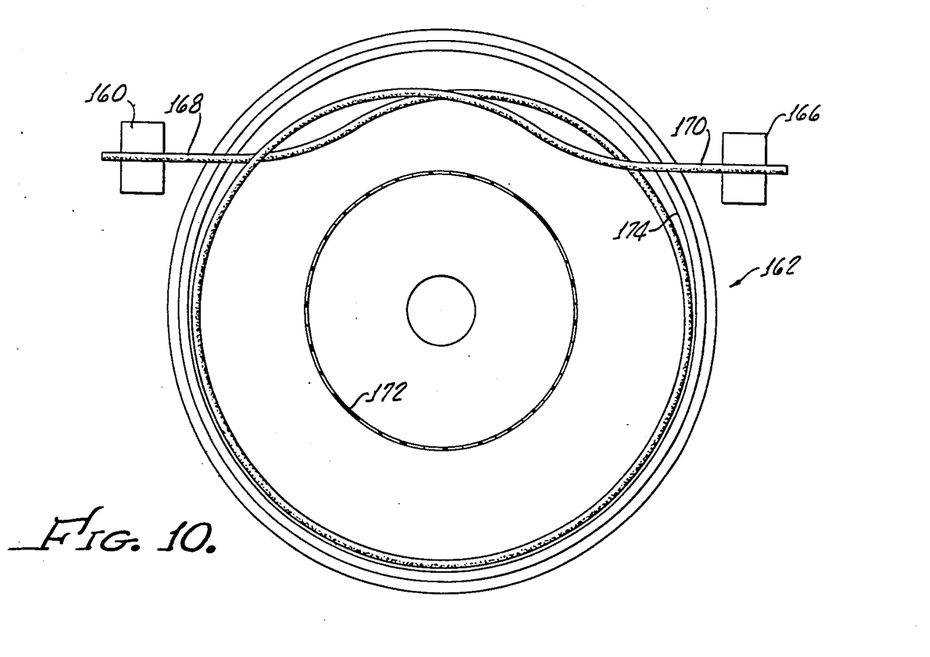

In one method for winding a wire on a reel of the type described in any one of FIGS. 6, 7 and 8, the reel is mounted on a rotatable chuck. This method is schematically illustrated in FIGS. 9 and 10. The chuck carries a clamp 160 that grasps one end of a wire to be wound upon the reel 162. The chuck, clamp and reel are then rotated in unison in the direction of arrow 164, thereby winding a length of wire on the reel until a predetermined amount of wire has been wound on the reel. Thereupon, the trailing edge of the wire is grasped in a second fixedly mounted clamp 166 and the wire severed so that a wire of predetermined length is wound upon the reel with both of its ends 168, 170 projecting from the reel and both of its ends held in individual clamps. In the winding of the wire upon the reel, reel rotation, and thus wire winding, is stopped when a predetermined length of wire has been wound upon the reel. However, when winding stops, the chuck mounted clamp 160, which grasps the leading end of the wire, may not be positioned at a point in the reel rotation to be in alignment with the clamp 166 that grasps the railing edge of the wire. For handling of the wire and reel and for transporting these along a conveyor, it is necessary that the two ends of the wire protruding from the reel be substantially aligned with one another, extending in opposite directions from the reel. Accordingly, it is necessary, after winding a predetermined length of wire on the reel, to back up and reverse reel rotation for some distance until the leading end of the wire is aligned with the trailing end. During such reverse rotation (in the direction of arrow 165), both wire ends remain firmly grasped in their clamps. The backing up of the chuck and reel will cause a partial unwinding of portions of the wire that have previously been wound upon the reel. Such an unwinding desirably occurs wholly within the wire receiving chamber, which has inner and outer limits schematically denoted at 172 and 174 in FIG. 9. Accordingly, the wire receiving chamber must have a size sufficient to enable a predetermined maximum amount of unwinding to take place within the chamber, if undesired wire bending is to be avoided. If the outer diameter of the chamber is not sufficiently great, the backing up of the reel and the consequent unwinding of wire within the chamber may result in undesired bends in the wire, or may force intermediate sections of the wire radially outwardly of the chamber between the entry lips, which is undesired.

A condition of required maximum unwinding may occur when two turns of wire have been wound in the chamber extending around the radially inner chamber section 172. In such maximum condition, the leading end of the wire must be backed up by nearly one full revolution. To avoid kinking or other undesired displacement of the wire, at least the wire chamber must be of a size such that its outer diameter is at least substantially equal to or greater than twice its inner diameter (e.g., outer diameter D must be equal to or greater than inner diameter $D_2$). Thus, considering a situation where a length of wire has two turns around the inner diameter of the chamber (as in FIG. 9) and the reel is backed up by nearly a full turn, the wire within the chamber now will make only one turn (FIG. 10) and can do so without undue bending or kinking only if the outer diameter of the chamber is two or more times the chamber inner diameter. If there are more than two turns of wire in the chamber when the reel is backed up one full revolution, or nearly one full revolution, the unwinding may be taken up by more than one turn of wire on the inner portion of the chamber and thus, a chamber of smaller relative outside diameter will accommodate such a situation. However, a wire receiving chamber in which the outer diameter is not less than about twice the inner diameter, is presently perferred in order to accommodate the described extreme situation.

As described above, the reels are inserted one at a time into the several recesses of the carousel support, which may be rotatable about a vertical axis to position any given recess in any orientation. One or more connectors are affixed to the connector crown and wires withdrawn one at a time for insertion into the connector apertures. This may be done manually or by automatic machines. In this operation, the spindle 56 need not be inserted through the reels since all the reels will be retained in the stacked position because as described above, the recess entry is slightly smaller than the reel diameter. However, to ensure retention of the stack of reels upon the carousel support, the spindle may be inserted through the central apertures of the reels of a stack of reels. To remove a stack of reels as an assembly, the support bar 60 is attached, as previously described, and the reels readily transported from the support carousel. Unexpectedly and surprisingly, it is found that when the unitary assembly of reels, spindle and support bar is detached from the carousel and moved from the carousel while ends of all wires of all reels remain secured to a connector, which itself remains fixed to the connector crown of the carousel, the wires will be twisted, each about its own axis and all wires twisted as a bundle. This may be achieved in several fashions, but generally by moving all wires in a direction parallel to the axis of the spindle and away from the stack of reels, thus causing each wire to be paid out from its reel without rotation of the reel in a manner in which a fishing line is paid out from the reel of a spinning reel. One may simply withdraw all wire from all reels by moving all of the wires upwardly in the direction of the axis of the spindle 56. Support arm 60 must be removed since in such a withdrawal each wire travels around the periphery of its stationary and non-rotating reel as it is withdrawn.

Figure 11:
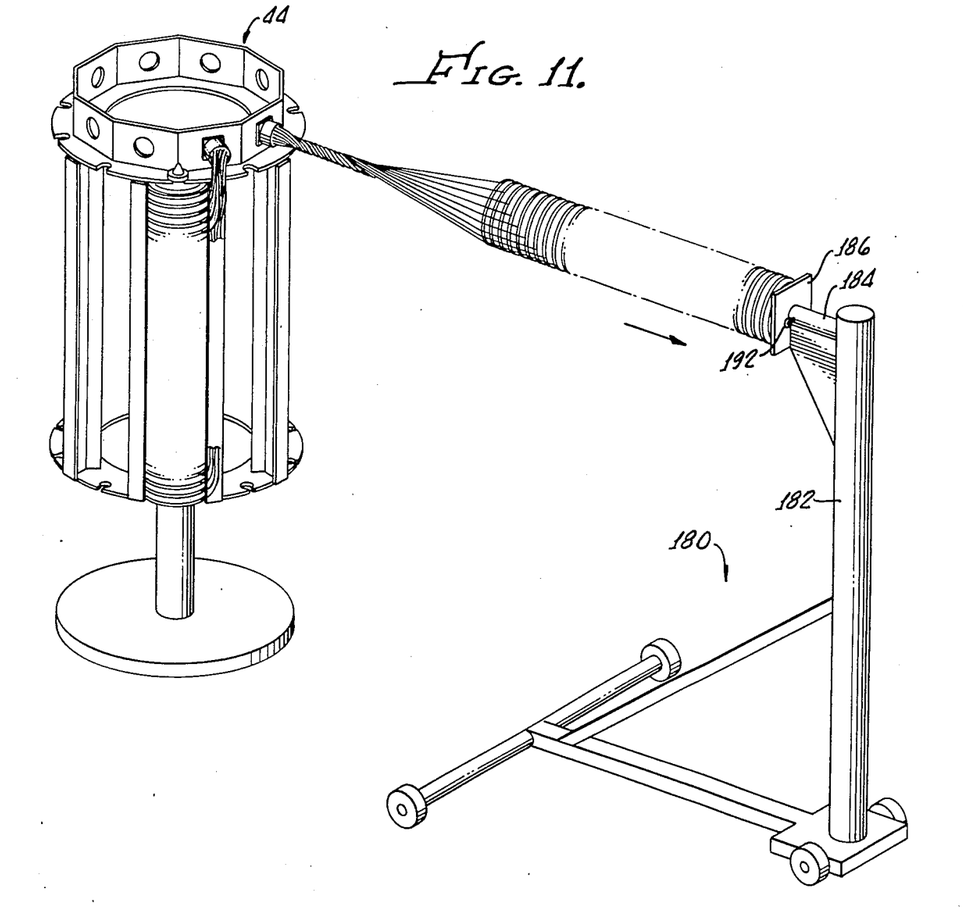
FIG. 11 is a pictorial view of a fixture for withdrawing wires from all of the reels for twisting the wires into a bundle.
Figure 12:
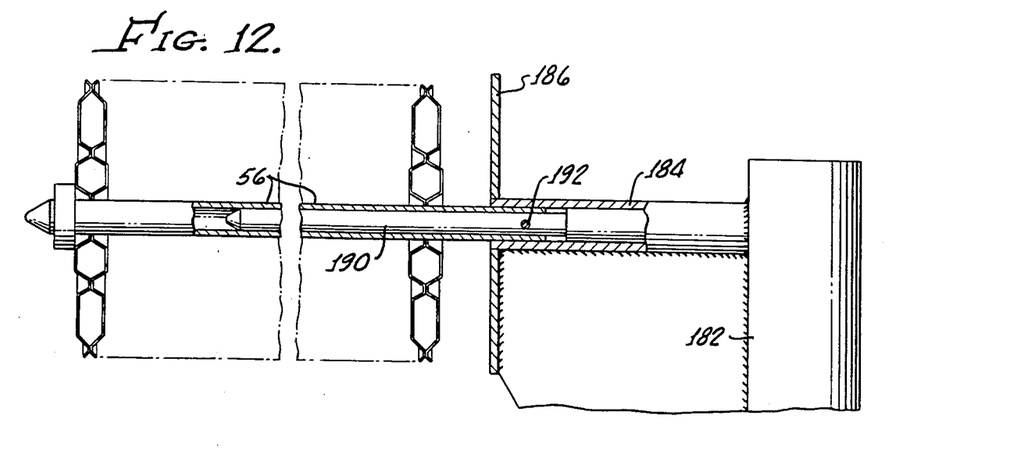
FIG. 12 is a sectional view through a stack of reels on the fixture of FIG. 11.

A simple fixture for withdrawing and twisting all wires from a stack of reels is illustrated in FIGS. 11 and 12, which shows a wheeled carriage 180 having an upstanding column 182 carrying a horizontally directed hollow sleeve 184 having an apertured reel-engaging flange 186 secured to its free end. A horizontally extending rod 190 secured to sleeve 184 telescopically receives the reel spindle 56 which may be retained on the fixture by means of a detachable pin 192. The stack of reels on the spindle 56 is removed from the carousel and mounted upon the rod 190 as illustrated in the drawings, so that as the carriage 180 carrying the now horizontal stack of reels is moved in the direction of arrow 196, away from the carousel mounted connector to which the ends of all the wires have been connected, the wires will be simultaneously paid out, causing all the wires to be twisted in a bundle.

The foregoing description is to be understood clearly as given by way of illustration and example only, the spirit and scope of this invention being limited solely by the appended claims.

What is claimed is:

1. A stackable wire handling reel comprising
   first and second side plates, each side plate comprising:
      an outwardly bent annular cavity section having a peripheral lip,
      an outwardly bent inner section including a hub section located radially inwardly of said annular cavity section,
   said side plates being secured to each other at points located between said cavity and inner sections, each plate having an annular intermediate section spaced inwardly of said cavity section, and each side plate having an outwardly facing circular groove, each groove having a bottom formed by an outer surface of said intermediate section and sides formed by outer surfaces of said cavity and inner sections, said cavity sections mating with each other to form a wire receiving chamber having a radially outer periphery defined by adjacent peripheral lips of said annular cavity sections, said wire receiving chamber having a length of wire wound therein, and said wire having at least one end passing between said peripheral lips and projecting from said chamber.

2. The apparatus of claim 1 wherein outer surfaces of said inner sections are mutually spaced by a distance greater than the distance between outer surfaces of said cavity sections, whereby said apparatus can be stacked upon and positioned parallel to a similar apparatus with projecting wire.

* * * * *